(12) United States Patent
Wu et al.

(10) Patent No.: US 9,552,435 B2
(45) Date of Patent: Jan. 24, 2017

(54) METHOD AND SYSTEM FOR INCREMENTAL COLLECTION OF FORUM REPLIES

(75) Inventors: Xinli Wu, Beijing (CN); Jianwu Yang, Beijing (CN)

(73) Assignees: Peking University Founder Group Co., Ltd., Beijing (CN); Peking University Founder R & D Center, Beijing (CN); Beijing Founder Electronics Co., Ltd., Beijing (CN); Peking University, Beijing (CN)

( * ) Notice: Subject to any disclaimer, the term of this patent is extended or adjusted under 35 U.S.C. 154(b) by 737 days.

(21) Appl. No.: 13/997,257

(22) PCT Filed: Dec. 22, 2011

(86) PCT No.: PCT/CN2011/084457
§ 371 (c)(1),
(2), (4) Date: Oct. 14, 2013

(87) PCT Pub. No.: WO2012/083870
PCT Pub. Date: Jun. 28, 2012

(65) Prior Publication Data
US 2015/0127644 A1    May 7, 2015

(30) Foreign Application Priority Data
Dec. 22, 2010    (CN) .......................... 2010 1 0618393

(51) Int. Cl.
*G06F 17/30*    (2006.01)
*G06Q 10/10*    (2012.01)

(52) U.S. Cl.
CPC ..... *G06F 17/30887* (2013.01); *G06F 17/3089* (2013.01); *G06F 17/30876* (2013.01); *G06Q 10/10* (2013.01)

(58) Field of Classification Search
CPC .................. G06F 17/30887; G06F 17/30876
(Continued)

(56) References Cited

U.S. PATENT DOCUMENTS

| 7,617,193 B2 * | 11/2009 | Bitan | G06F 17/30864 |
| | | | 707/769 |
| 8,010,544 B2 * | 8/2011 | Tiyyagura | G06F 17/30622 |
| | | | 707/758 |

(Continued)

FOREIGN PATENT DOCUMENTS

| CN | 1011903038 A | 6/2008 |
| CN | 101335639 A | 12/2008 |

(Continued)

OTHER PUBLICATIONS

PCT/CN2011/084457 English Translation of the Written Opinion of the International Searching Authority mailed Apr. 5, 2012, 5 pages.

(Continued)

*Primary Examiner* — Shahid Alam
(74) *Attorney, Agent, or Firm* — Lathrop & Gage LLP (57) ABSTRACT

The present application discloses methods and systems for incrementally collecting replies in a forum and belongs to the technical field of collecting network information. The method comprises periodically determining whether there is a newly-established post and a post having new replies in all forum list pages needed to be collected: if yes, extracting a main post and reply information from the newly-established post, and extracting the information of the new replies from the post having new replies. The system comprises a determining device (11) for periodically determining whether there is a newly-established post and a post having new replies in all forum list pages needed to be collected; and an extracting device (12) for extracting a main post and reply information from the newly-established post, and extracting the information of the new replies from the post having new (Continued)

replies. The present application can quickly, accurately and completely collect all main post/replies of a post, so that the drawback that the information of turned pages of a post are missed to be searched or cannot be searched through a general search engine may be overcome.

20 Claims, 4 Drawing Sheets

(58) Field of Classification Search
USPC .................................. 707/709, 736; 706/50
See application file for complete search history.

(56) References Cited

U.S. PATENT DOCUMENTS

| | | | | |
|---|---|---|---|---|
| 2003/0084035 A1* | 5/2003 | Emerick, III | ..... | G06F 17/30864 707/769 |
| 2004/0225644 A1* | 11/2004 | Squillante | ......... | G06F 17/30864 707/769 |
| 2005/0192936 A1* | 9/2005 | Meek | ................ | G06F 17/30864 707/769 |
| 2007/0106663 A1* | 5/2007 | Rosenberg | ........ | G06F 17/30716 707/723 |
| 2010/0205168 A1* | 8/2010 | Yang | ................. | G06F 17/30864 707/709 |
| 2010/0241621 A1* | 9/2010 | Randall | ............. | G06F 17/30864 707/709 |
| 2011/0225115 A1* | 9/2011 | Moitra | .............. | G06F 17/30864 706/50 |

FOREIGN PATENT DOCUMENTS

| | | |
|---|---|---|
| CN | 101727486 A | 6/2010 |
| CN | 2011084457 A1 | 3/2014 |

OTHER PUBLICATIONS

PCT/CN2011/084457 English Translation of the International Search Report mailed Apr. 5, 2012, 2 pages.

Internet forum—from Wikipedia, https://web.archive.org/web20101130010720/http://en.wikipedia.org/wiki/Internet_forum; Feb. 23, 2015, 8 pages.

* cited by examiner

METHOD AND SYSTEM FOR INCREMENTAL COLLECTION OF FORUM REPLIES

CROSS REFERENCE TO RELATED APPLICATIONS

This application is a 35 USC §371 National Stage application of International Application No. PCT/CN2011/084457 filed Dec. 22, 2011, which claims the benefit of priority to China Patent Application No. 201010618393.4 filed Dec. 22, 2010. The disclosure of each of the prior applications is considered part of and is incorporated by reference in the disclosure of this application.

TECHNICAL FIELD

The present application relates to the technical field of collecting network information, in particular, to methods and systems for incrementally collecting replies in a forum.

BACKGROUND

With the advent of Internet, especially the wide use of various Internet or network forums and communities users or user groups worldwide can freely express and exchange various ideas together. China now has more than one million Internet forums, and 80% of websites in China have independent forums. There are more than 100 million frequent or active Internet users on various network forums in China. Different from other forums, network forums have the characteristics of reaching audience in a wide range of Internet users in a very short time. A particular hot topic posted on such a network forum may very quickly attract the attention tens of thousands of users to post replies and discussions and the posted replies and discussions may form hundreds or thousands of pages in a very short period of time. At this time, the users are interested in not only the content or opinion of the initiator or the contents of the main post but also the opinions on the main post expressed by other users. However, it is difficult to query the replied information in multiple turned pages through a general search engine. Even if sometimes the replied information in the multiple pages can be queried, the time effectiveness is not ideal due to the large data delay. Current forum collection systems merely collect information in the first page of a post, without the information of the replies in remaining pages of the post.

SUMMARY

In view of the drawbacks in the prior art, the present application provides a method and a system for incrementally collecting replies in a forum. The method and the system are capable of quickly, accurately and completely collecting all main post/replies of a post, thus overcoming the drawback in a general search engine that the information in turned pages of a post would be missed or cannot be searched, and the drawback in current forum collection systems that merely collect information in the first page of a post, without the information of the replies of the post.

In order to solve the above technical issues, the following technical solutions are provided.

According to an embodiment of the present application, a method for incrementally collecting replies in a forum is provided, comprising:

(1) determining periodically whether there is a newly-established post or a post with new replies in all forum list pages needed to be collected, according to a URL of a first page of the post and the number of replies to the post;

(2) if it is determined that there is a newly-established post, extracting a main post of the newly-established post and reply information from the newly-established post; if it is determined that there is a post with new replies, calculating an origination of and the number of the new replies to, based on the calculated origination and the calculated number, extract the new replies from the post with new replies.

According to another embodiment of the present application, a system for incrementally collecting replies in a forum is provided, comprising:

a determining device for periodically determining whether there is a newly-established post and a post having new replies in all forum list pages needed to be collected, according to the URL of the first page of the post and the information of the number of replies to the post;

an extracting device for extracting a main post and reply information from the newly-established post, or for the post having new replies, calculating the origination and the number of the new replies, and extracting the information of the new replies from the post having new replies according to the origination and the number of the new replies.

According to the method and the system of the present application, by periodically monitoring a list page, the information of a newly-established post and a post having new replies in the list pages can be acquired in time. Repeated collection is avoided by a quick process of eliminating duplicates according to URL identification and information of the number of replies. The object of quickly collecting replies of a turned page may be achieved by distinguishing different extracting modes of page turning. Therefore, all main post/replies of a post may be quickly, accurately and completely collected. Less than 5% of replies may be missed to be collected and the real time performance may be in the order of minutes.

DETAILED DESCRIPTION

Hereinafter, the present application will be explained in detail with reference to the accompanying drawings in connection with the specific embodiments.

Figure 1:
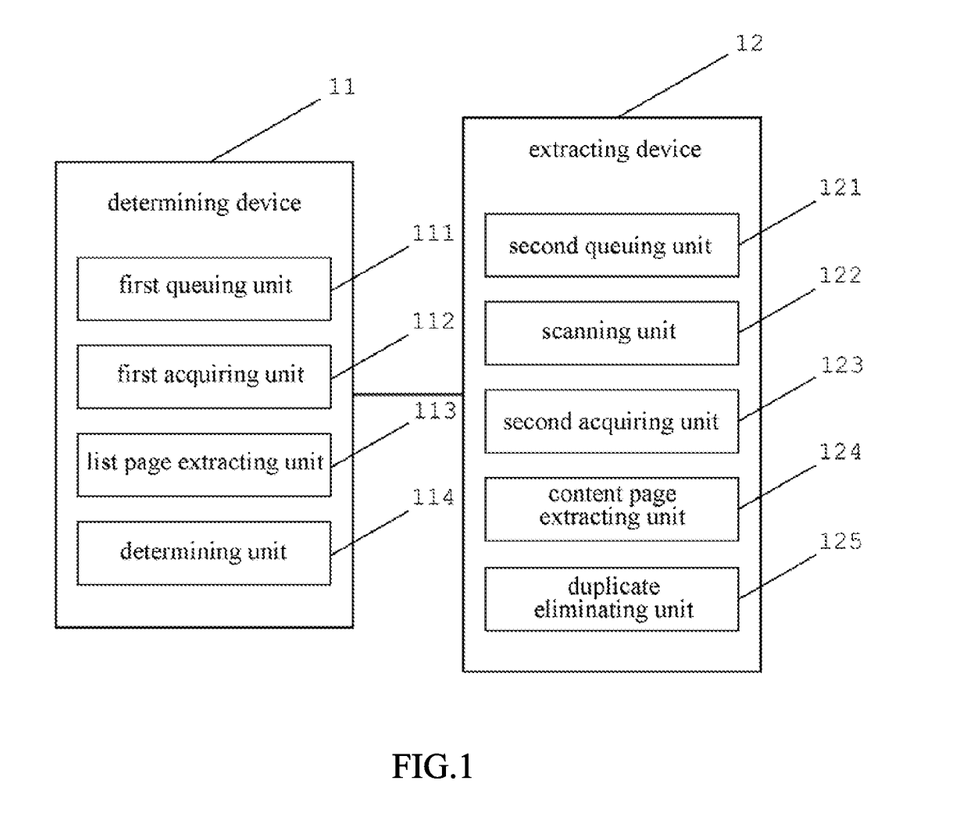
FIG. 1 is a block diagram of a system for incrementally collecting replies in a forum according to an embodiment of the present application.

As shown in FIG. 1, a system for incrementally collecting replies in a forum according to an embodiment comprises a determining device 11 and an extracting device 12 connected to the determining device 11. The determining device 11 includes a first queuing unit 111, a first acquiring unit 112, a list page extracting unit 113 and a determining unit 114. The extracting device 12 includes a second queuing unit 121, a scanning unit 122, a second acquiring unit 123, a content page extracting unit 124 and a duplicate eliminating unit 125.

The determining device 11 is used for periodically determining whether there is a newly-established post or a post having new replies in all forum list pages needed to be collected, according to the URL of the first page of the post and the number of replies to the post. The first queuing unit 111 is used for adding the URLs of all forum list pages needed to be collected into a collection queue of list pages. The first acquiring unit 112 is used for acquiring each URL of a list page from the collection queue of list pages. The list page extracting unit 113 is used for extracting, for each of the acquired URL of a list page, webpage contents corresponding to the URL of the list page, and extracting the URL of the first page of each post and the number of current replies from the webpage contents. The determining unit 114 is used for determining whether each post exists in an information list of collected posts according to the URL of the first page of the post. If a post exists in the information list, then the determining unit 114 continues to determine whether the number of current replies to the post is larger than the number of present replies recorded in the information list of collected posts. If yes, then the determining unit 114 renders a termination that the post has a new reply and accordingly updates the number of previous replies and the number of present replies of the post in the information list of collected posts. If the post does not exist in the information list of collected posts, the post is treated as a newly-established post and the URL of the first page and the number of current replies are added into the information list of collected posts.

The extracting device 12 is used for extracting a main post and reply information from the newly-established post. For the post having new replies, the extracting device 12 is configured to calculate the origination and the number of the new replies, and extract the information of the new replies from the post having new replies according to the calculated origination and the calculated number. The second queuing unit 121 is used for adding the URL of the first page of the newly-established post and the URL of the post having new replies into a collection queue of content pages. The scanning unit 122 is used for regularly scanning the collection queue of content pages. The second acquiring unit 123 is used for acquiring each URL from the collection queue of content pages. The content page extracting unit 124 is used for extracting webpage contents corresponding to the URL and extracting the main post and/or reply and/or URLs of turned pages from the webpage contents. The duplicate eliminating unit 125 is used for eliminating a duplicate of the URLs of turned pages extracted from the webpage contents when the page turning mode in the forum is next page turning. The second queuing unit 121 is further used for adding the URLs of the turned pages, of which the duplicate is eliminated into the collection queue of content pages.

Figure 2:
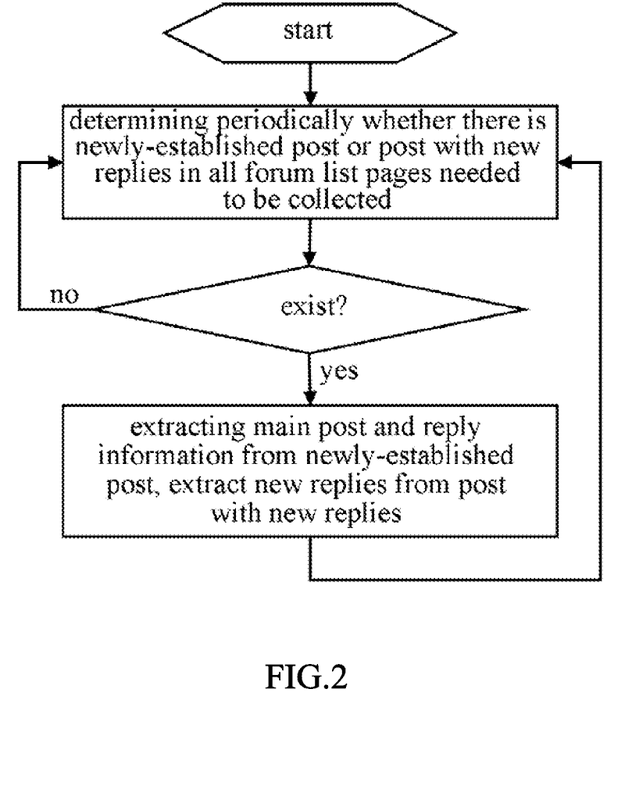
FIG. 2 is a flowchart illustrating a method for incrementally collecting replies in a forum according to an embodiment of the present application.

As shown in FIG. 2, a method for incrementally collecting replies in a forum based on the system shown in FIG. 1 according to an embodiment comprises the following steps.

Step (1): the determining device 11 periodically determines whether there is a newly-established post and/or a post having new replies in all forum list pages needed to be collected.

Figure 3:
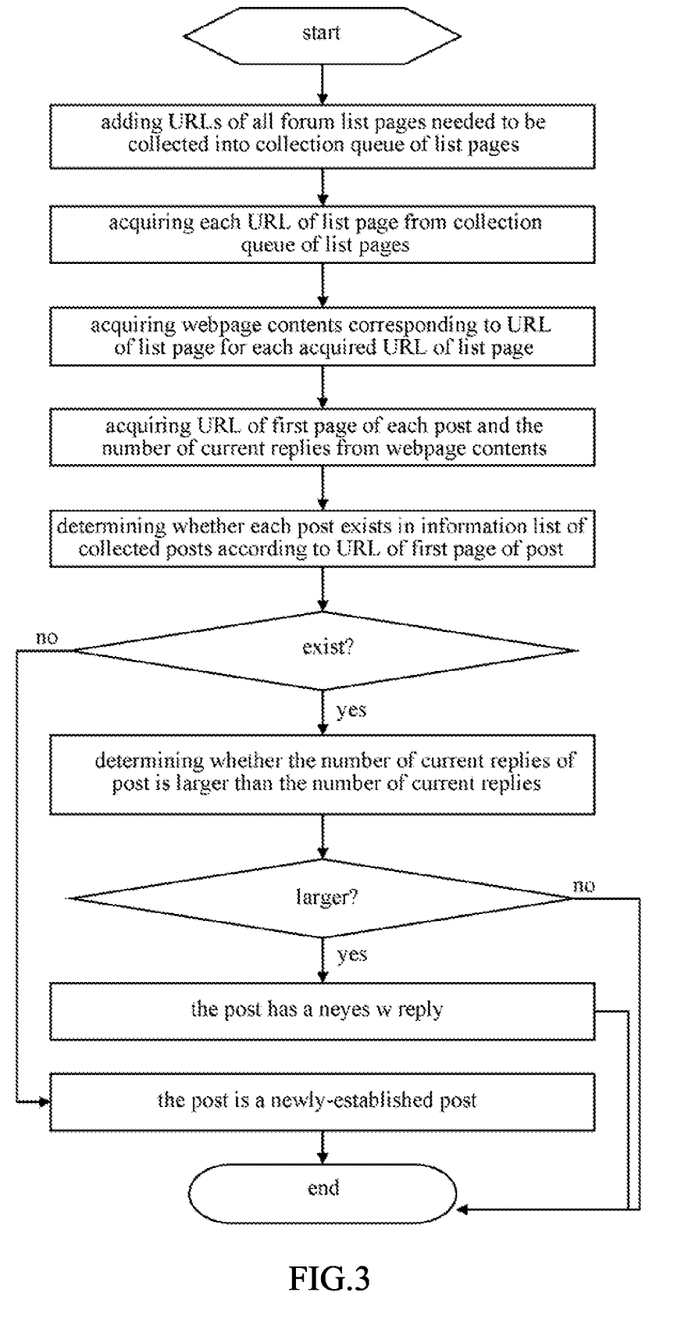
FIG. 3 is a flowchart illustrating a method for determining whether there is a newly-established post and/or a post having new replies in a list page according to an embodiment of the present application.

As shown in FIG. 3, the method for the determining according to this embodiment comprises the following steps (a)-(d).

Step (a): the first queuing unit 111 adds the URLs of all forum list pages needed to be collected into the collection queue of list pages. The list page refers to the one which contains the information such as titles, URL (uniform resource locator), the number of clicks, the number of replies of all posts, but does not contain the specific contents of the posts. For example, the list page of the financial hodgepodge channel of Sohu forum, its URL is:

http://club.business.sohu.com/1-enjoy-0-0-0-0.html.

For another example, the list page of the international forum channel of powerful nation community of People Net, its URL is:

http://bbs1.people.com.cn/ boardList.do?action=postList&boardId=6.

In this embodiment, a collection interval is set for each forum list page needed to be collected. For example, the information for each forum list page is collected every other five minutes. The collection interval for each forum list page is monitored. When a collection interval time for each forum list page expires, the URL of this list page is added into the collection queue of list pages.

Preferably, the refresh interval is dynamically adjusted according to the update frequency of the forum. If the update frequency of the forum is high, the refresh interval is set to be short accordingly; and if the update frequency of the forum is low, the refresh interval is set to be long accordingly. For example, it is preset to collect every other five minutes, if it is found that the update frequency of the forum increases, then the refresh interval is shortened to be three minutes, one minute or less.

The method for calculating the update frequency in a forum has been disclosed in Chinese patent application "method and device for directionally collecting webpage data information" (application number: 201010236363.7), and thus the description thereof is omitted.

Step (b): the first acquiring unit 112 acquires each URL of the list page from the collection queue of list pages.

In this embodiment, the method for acquiring the URL of the list page from the collection queue of list pages includes a step of regularly scanning the collection queue of list pages (the scanning interval can be set by the user according to the specific application). If the collection queue of list pages is not empty, then the URLs of list pages are acquired in turn from the collection queue of list pages according to a First-In-First-Out order (after the URL is acquired from the queue, the URL will be automatically deleted from the queue), and the friendly access condition of the website of the URLs of the list pages is met.

If URL of a list page does not meet the friendly access condition of the website of the URL of the list page, then the URL of this list page is ignored in this scanning and the URL of the next list page is determined. The URL of this list page is remained to proceed in a subsequent scanning.

The friendly access conditions of the website include quantity restriction of current accesses and interval restriction of accesses. The method for determining whether the friendly access conditions of a web site has been disclosed in Chinese patent application "method and system for capturing webpages from servers of different IPs in website" (application number: 201010546334.0), and thus the description thereof is omitted.

Step (c): the list page extracting unit 113 acquires webpage contents corresponding to the URL of each list page, and then extracts, from the webpage contents, the URL of the first page of each post and the number of current replies.

According to the each URL of list page, a HTTP request for acquiring the contents corresponding to the URL is sent to the website and the returned webpage contents are received. The method of acquiring the URL of the first page of each post and the current of number replies from the webpage contents is well known in the art, and thus the description thereof is omitted.

Step (d): the determining unit 114 determines whether each post exists in the information list of collected posts according to the URL of the first page of the post. If the post exists in the information list, then it indicates that the post has been collected and continues to determine whether the number of current replies of the post is larger than the number of current replies recorded in the information list of collected posts. If so, then it determines that the post has a new reply and updates the number of previous replies and the number of present replies of the post in the information list of collected posts. That is, the number of previous replies of the post in the information list of collected posts is replaced with the number of present replies, and the number of present replies of the post in the information list of collected posts is replaced with the number of present replies. If the number of current replies of the post is not larger than the number of current replies recorded in the information list of collected posts, then it indicates that the post has no new reply and this URL is ignored without any subsequent process. If the post does not exist in the information list of collected posts, then it indicates that the post is a newly-established post, and the URL of the first page of this post and the number of current replies are added in the information list of collected posts. The number of previous replies of the post is 0 and the number of present replies of the post is the number of current replies.

The information list of collected posts stores the URLs of first pages of collected posts and the numbers of last replies and present replies of collected posts. The structure of the list is shown as below.

| URLs of first pages of collected posts | the number of previous replies | the number of present replies |
| --- | --- | --- |
| URL$_1$ (value MD5 of URL$_1$) | a$_1$ | a$_2$ |
| URL$_2$ (value MD5 of URL$_2$) | b$_1$ | b$_2$ |
| ... | | ... |
| URL$_n$ (value MD5 of URL$_n$) | n$_1$ | n$_2$ |

Preferably, the identification information of the URL of the first page of the post is stored in the information list of collected posts, such as MD5 codes. By comparing the identification information, it determines whether the URL of the first page of the post is stored in the information list of collected posts. In this way, the comparing efficiency of URL can be improved.

Step (2): if there is a newly-established post and/or a post having new replies in all forum list pages needed to be collected, the extracting device 12 operates to extract a main post and reply information from the new posts and extract the information of the new replies from the posts having new replies.

Figure 4:
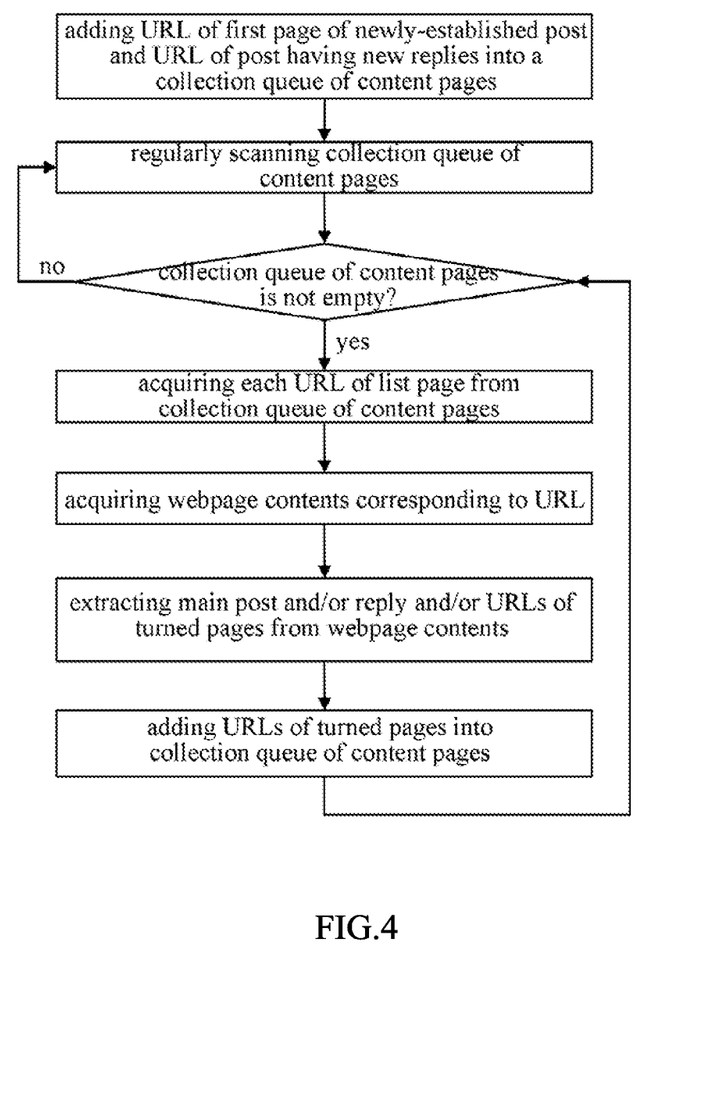
FIG. 4 is a flowchart illustrating a method for extracting the information of a main post and replies from a newly-established post and extracting the information of a new reply from a post having new replies according to an embodiment of the present application.

As shown in FIG. 4, the method for extracting according to an embodiment comprises the following steps.

Step (i): in this step, the second queuing unit 121 operates to add the URL of the first page of the newly-established post and the URL of the post having new replies into a collection queue of content pages.

For a new-established post, if the URL of the first page of the post exists in the collection queue of content pages, the URL of the first page of the post is extracted and the number of present replies to the post recorded in the information list of collected posts is amended to be the number of current replies. The URL of the first page of the post is inserted into the collection queue of content pages. If the URL of the first page of the post does not exist in the collection queue of content pages, the URL of the first page of the post is directly added into the collection queue of content pages.

For a post having new replies, if the page turning mode in the forum of the post is calculation page turning, the URL of the first page of the post having new replies is directly added into the collection queue of content pages. If the page turning mode in the forum of the post is next page turning, the information table of URLs of turned pages of the post is searched out and the last URL of turned page of the post is added into the collection queue of content pages.

The mode of calculation page turning refers to a mode, in which the number of replies of each page is certain. For example, the post of the international channel of powerful nation community of People Net, http://bbs1.people.com.cn/postDetail.do?boardId=6&view=1&id=91384467, is configured in the mode of calculation page turning.

The mode of next page turning refers to a mode, in which the number of replies of each page is uncertain. For example, the post in Tianya by-talk, http://www.Tianya.cn/publicforum/content/free/1/1880805.shtml, is configured in the mode of next page turning.

Step (ii): the collection queue of content pages is regularly scanned by the scanning unit 122. The scanning interval can be set by the user according to the specific application.

Step (iii): if the collection queue of content pages is not empty, each URL from the collection queue of content pages will be acquired by the second acquiring unit 123. After the URL is acquired from the collection queue, the URL is automatically deleted from the collection queue.

In this embodiment, the method of acquiring URLs from the collection queue of content pages by the second acquiring unit 123 is identical to the method of acquiring URLs from the collection queue of content pages by the first acquiring unit 112, and the description thereof is omitted.

Step (iv): the content page extracting unit 124 operates to acquire webpage contents corresponding to the acquired URL, extract the main post and/or reply and/or URLs of turned pages from the webpage contents and add the URLs of turned pages into the collection queue of content pages in this step.

In this embodiment, one specific implementation for extracting the main post and/or reply is as follows.

If the URL is the URL of the first page of the post and is collected for the first time, the post is a newly-established post and the information of the main post and replies are extracted from the webpage contents corresponding to the URL. Specifically, it is firstly determined whether the styles of the main post and replies are consistent. If so, the information is extracted one by one in the same way, and the first extracted information is used as the main post, and the other information are used as replies. If not, the information of the main post is firstly extracted in accordance with the preset rules, and the information of each reply is then extracted. It is manually set to determine whether the styles of the main post and replies are consistent, and the preset rule is a keyword or regular expression set manually.

If the URL is the URL of the first page of the post but is not collected for the first time, the post is a post having new replies, the origination of replies $S'_{From}$ and the number of the new replies $C'_{ParseCount}$ are calculated according to the following formulae, and $C'_{ParseCount}$ new replies are extracted from the origination of new replies $S'_{From}$.

$$S'_{From} = \begin{cases} R_{PreNum}, & N_{PerPage} \text{ includes main post} \\ R_{PreNum} + 1, & N_{PerPage} \text{ does not include main post} \end{cases}$$

$$C'_{ParseCount} = R_{CurNum} - R_{PreNum}$$

where, $R_{PreNum}$ represents the number of the replies to the post of the previous collection, $R_{CurNum}$ represents the number of current replies to the post, and $N_{PerPage}$ represents the number of replies to the post per page.

If the URL is not the URL of the first page of the post, it is further determined whether it is the URL of an overlapping page. The overlapping page refers to the page in which the information are all information of replies and part of replies are new replies. It is determined that it is an overlapping page if the page index corresponding to the URL is identical to that of the page that should be currently extracted. The page index of the page that should be currently extracted is calculated by rule of:

$$P_{Begin} = \begin{cases} \text{ceil}\left(\dfrac{R_{PreNum} + 1}{N_{PerPage}}\right), & N_{PerPage} \text{ includes main post} \\ \text{ceil}\left(\dfrac{R_{PreNum}}{N_{PerPage}}\right), & N_{PerPage} \text{ does not include main post} \end{cases}$$

where, $P_{Begin}$ represents the page index of the page which should be currently extracted, and ceil represents the operation of rounding up.

If it is an overlapping page, the origination $S''_{From}$ and the number $C''_{ParseCount}$ of new replies are recalculated according to the following formulae, and $C''_{ParseCount}$ new replies are extracted from the origination of new replies $S''_{From}$.

$$S''_{From} = \begin{cases} R_{PreNum} \% N_{PerPage} + 1, & N_{PerPage} \text{ includes main post} \\ R_{PreNum} \% N_{PerPage}, & N_{PerPage} \text{ does not include main post} \end{cases}$$

$$C''_{ParseCount} = \begin{cases} R_{CurNum} - R_{PerNum}, & \text{this page is last page} \\ N_{PerPage} - S''_{From}, & \text{this page is not last page} \end{cases}$$

where, "%" represents the operation of taking the remainder.

If the URL is neither the URL of the first page of the post, nor the URL of the overlapping page, i.e., all the contents of this page are new replies, the origination $S'''_{From}$ and the number $C'''_{ParseCount}$ of new replies are recalculated according to the following formulae, and $C'''_{ParseCount}$ new replies are extracted from the origination of new replies $S'''_{From}$.

$$S'''_{From} = 0;$$

and $$C'''_{ParseCount} = \begin{cases} \begin{cases} R_{CurNum} \% N_{PerPage} + 1, & N_{PerPage} \text{ includes main post} \\ \begin{cases} (R_{CurNum} - 1) \% N_{PerPage} + 1, & \text{if } R_{CurNum} - 1 > 0, \text{ this page is last page} \\ 0, & \text{if } R_{CurNum} - 1 = 0, N_{PerPage} \text{ does not include main post} \end{cases} \end{cases} \\ N_{PerPage}, \text{ this page is not last page} \end{cases}$$

The method of extracting the URL of turned page from webpage content is as follows.

① If the page turning mode in the forum is calculation page turning and the URL refers to the first page of the post, the beginning and ending page indexes of the turned page (i.e., the beginning and ending page indexes of the pages containing the new replies) are calculated according to the following formulae. If the URL does not refer to the first page of the post, the URLs of turned pages will not be extracted.

$$P_{Begin} = \begin{cases} \text{ceil}\left(\dfrac{R_{PreNum} + 1}{N_{PerPage}}\right), & N_{PerPage} \text{ includes main post} \\ \text{ceil}\left(\dfrac{R_{PreNum}}{N_{PerPage}}\right), & N_{PerPage} \text{ does not include main post} \end{cases}$$

$$P_{End} = \begin{cases} \text{ceil}\left(\dfrac{R_{CurNum} + 1}{N_{PerPage}}\right), & N_{PerPage} \text{ includes main post} \\ \text{ceil}\left(\dfrac{R_{CurNum}}{N_{PerPage}}\right), & N_{PerPage} \text{ does not include main post} \end{cases}$$

$$S_{From} = \begin{cases} R_{PreNum} \% N_{PerPage} + 1, & N_{PerPage} \text{ includes main post} \\ R_{PreNum} \% N_{PerPage}, & N_{PerPage} \text{ does not include main post} \end{cases}$$

If $S_{From} = 0$ and $R_{PreNum} > 0$, then $S_{From} = N_{PerPage}$, $P_{Begin} = P_{Begin} + 1.$ where, $P_{Begin}$ and $P_{End}$ represent the beginning and ending page indexes of the turned pages, respectively, $S_{From}$ represents the origination of the new replies, and all the replies from the origination to the ending page index are new replies. After the beginning and ending page indexes of the turned pages are calculated according to the above formulae, in combination of preset rules of URLs of turned pages, all the URLs of turned pages are joined.

The specific method for joining URL includes a step of joining the URLs of turned pages according to the configured rules of page turning, the beginning page index of turned pages, and the base number of turned pages. In this embodiment, according to the configured rules of page turning, the URLs of turned pages are divided to three parts, wherein the first and third parts, strBeforePage and strAfterPage are invariant parts, and the second part nPageUp is a variant part. Pseudo codes of joining process of URLs of turned pages is the following:

```
for (int i = P_Begin ; i < P_End ;i + +)
{
    nPageNo = i + nFirstPostPageIndex - 1;
    nPageUp = (nPageNo × nPageUsBaseNum);
    strPostPageUrl = strBeforePage + nPageUp + strAfterPage;
}
``` where, nPageNo represents the page index of a new reply, and nFirstPostPageIndex represents the page index of the first page of post. In an actual forum, the value of nFirstPostPageIndex may be 0 or 1, namely, if the post pages are numbered starting from 0, the page index of the first page is 0; or if the post pages are numbered starting from 1, the page index of the first page is 1. nPageUp represents the page index indicating the turned page filled in the URL to be joined, namely, the value of the second part. nPageUsBaseNum represents the base number of turned pages, strPostPageUrl represents the joined URL.

Example 1

The URL of a post in the international forum channel of powerful nation community of People Net is:
http://bbs1.people.com.cn/postDetail.do?boardId=6&view=1&id=91384467
Its rule of page turning is:
/postDetail\.do\?id=\d+&view=\d+&pageNo=(\d+)&boardId=6

The page index of the first page nFirstPostPageIndex is 1, the base number of turned pages nPageUsBaseNum is 1, $N_{PerPage}$ is 20.

According to the rule of page turning, the first and the third parts of turned pages are extracted as:
"/postDetail.do?id=91384467&view=1&pageNo=" and "&boardId=6".

According to the above information, if a post has 210 replies when the post is firstly collected, then there are 10 joined URLs of turned pages:

```
/postDetail.do?id=91384467&view=1&pageNo=2&boardId=6
/postDetail.do?id=91384467&view=1&pageNo=3&boardId=6
/postDetail.do?id=91384467&view=1&pageNo=4&boardId=6
......
/postDetail.do?id=91384467&view=1&pageNo=11&boardId=6
```

Example 2

The URL of a post in Baidu Post Bar is:
http://tieba.baidu.com/f?kz=919731090.
Its rule of page turning is

```
/f?z=919731090&ct=335544320&lm=0&sc=0&rn=30&tn=
baiduPostBrowser&word=%B6%B7%C6%C6%B2%D4%F1%B7&pn=30
```

The page index of the first page is 0, the base number of turned pages nPageUsBaseNum is 30. According to the rule of page turning, the first part of turned pages is extracted as:

```
/f?z=919731090&ct=335544320&lm=0&sc=0&rn=30&tn=
baiduPostBrowser&word=%B6%B7%C6%C6%B2%D4%F1%B7&pn=.
```

The third part is blank.
$N_{PerPage}$ is 30.
According to the above information, if a post has 210 replies when the post is firstly collected, then there are 6 joined URLs of turned pages:

```
/f?z=919731090&ct=335544320&lm=0&sc=0&rn=30&tn=
baiduPostBrowser&word=%B6%B7%C6%C6%B2%D4%F1%B7&pn=30
/f?z=919731090&ct=335544320&lm=0&sc=0&rn=30&tn=
baiduPostBrowser&word=%B6%B7%C6%C6%B2%D4%F1%B7&pn=60
/f?z=919731090&ct=335544320&lm=0&sc=0&rn=30&tn=
baiduPostBrowser&word=%B6%B7%C6%C6%B2%D4%F1%B7&pn=90
......
/f?z=919731090&ct=335544320&lm=0&sc=0&rn=30&tn=
baiduPostBrowser&word=%B6%B7%C6%C6%B2%D4%F1%B7&pn=210
```

Finally, all the joined URLs of turned pages are treated to be complete URLs with domain information and the treated URLs of turned pages are added into a collection queue of content pages.

② If the page turning mode in the forum is next page turning, the URLs of turned pages are extracted from the webpage contents. If there is no URL of turned page in the webpage contents, it indicates that this page is the last page and there is no turned page.

For the mode of next page turning, after the URLs of turned pages are extracted from the webpage contents and before they are added are added into a collection queue of content pages, the duplicate eliminating unit 125 eliminates a duplicate of URLs of turned pages. The specific process is as follows.

The information table of URLs of turned pages is searched to determine whether the post corresponding to the URL of a turned page exists in the information table. If not, the information of turned pages of the post corresponding to the URL of the turned page is inserted into the information table and the URL of the turned page is inserted into a collection queue of content pages. Otherwise, it continues to determine whether the page index of the current turned page of the post is larger than the page index of the turned pages of the post recorded in the information table of URLs of turned pages. If yes, the page index of the turned pages of the post is updated to be the page index of the current page in the information table of URLs of turned pages and the URL of the turned page is added into a collection queue of content pages. If not, the page index of the turned pages of the post does not need to be updated in the information table of URLs of turned pages and the URL of turned pages may be directly deleted.

The information table of URLs of turned pages stores the URL of the first page of post (or identification information), the page indexes of currently collected turned pages, and the last reply position on the page currently collected, URL of currently collected turned pages. The header structure of the table is shown in the following.

| URL of the first page of post (or identification information) | page indexes of turned pages | the last reply position | URLs of turned pages |
| --- | --- | --- | --- |

Various modifications and variations to the present application can be readily made by those skilled in the art without departing from the spirit and range of the present application. Thus, the application intends to contain these modifications and variations, if these modifications and variations are defined within the scope of the following claims and their equivalents.

What is claimed is:

1. A computer-implemented method for incrementally collecting replies in a forum on a computer comprising a processor, the method comprising:
determining, using the processor, whether there is a newly-established post or a post with new replies in a forum list page, according to a URL of a first page of the post and number of replies to the post;
if it is determined that there is a newly-established post, extracting, using the processor, a main post of the newly-established post and reply information from the newly-established post; if it is determined that there is a post with new replies, calculating, using the processor, an origination and a number of the new replies to, based on the calculated origination and the calculated number, extract the new replies,
wherein the determining further comprises:
acquiring, using the processor, each URL of list page from a collection queue of list pages recording URLs of the at least one forum list page;
retrieving, using the processor, the URL of the first page of each post and the number of current replies from webpage contents corresponding to the acquired URL; and
determining, using the processor, if the post has been recorded in an information list of collected posts according to the retrieved URL of the first page,
if not, determining, using the processor, that the post is a newly-established post, and the method further comprises: adding, using the processor, the retrieved URL of the first page and the retrieved number of current replies into an information list of collected posts.

2. The method according to claim 1, wherein the determining further comprises:
retrieving a URL of the first page of each post and the number of current replies from webpage contents corresponding to URLs of the forum list page;
determining whether the post exists in an information list of collected posts according to the retrieved URL of the first page, and
whether the retrieved current number of replies is larger than a number of present replies recorded in said information list,
if yes, it is determined that the post has a new reply.

3. The method according to claim 2, further comprising:
adding the URL of the forum list page into a collection queue of forum list pages if a collection interval for the forum list page expires;
retrieving URLs of list pages from the collection queue of forum list pages in a First-In-First-Out order.

4. The method according to claim 3, wherein the collection interval is dynamically adjustable according to an update frequency of the forum of the URLs of list pages.

5. The method according to claim 3, wherein the URLs retrieved from the collection queue of list pages meet a friendly access condition of the website of the retrieved URLs of list pages.

6. The method according to claim 2, further comprising:
adding the URL of the first page of the newly-established post or the URL of the post with new replies into a collection queue of content pages;
extracting the main post and/or reply and/or URLs of turned pages from the webpage contents corresponding to URLs of the forum list page.

7. The method according to claim 6, wherein,
for the new-established post, if the URL of the first page of the post exists in the collection queue of content pages, the method further comprises:
extracting the URL of the first page of the post;
replacing a record of a number of present replies of the post in the information list of collected posts with the number of current replies;
inserting the URL of the first page of the post into the collection queue of content pages.

8. The method according to claim 6, wherein the retrieving of URLs of list pages from the collection queue of forum list pages comprises:
acquiring the URLs of list pages from the collection queue of list pages in order of FIFO, the acquired URLs meeting a friendly access condition of the website of the URLs of list pages.

9. The method according to claim 6, wherein extracting the main post and/or reply information from the webpage contents in step (iv) comprises:
if the URL is the URL of the first page of the post and is collected for the first time, extracting the main post and reply information from the webpage contents corresponding to the URL;
if the URL is the URL of the first page of the post but is not collected for the first time, calculating an origination of new replies $S'_{From}$ and the number of new replies $C'_{ParseCount}$ according to the following formulae, and extracting $C'_{ParseCount}$ new replies from the origination of new replies $S'_{From}$.

$$S'_{From} = \begin{cases} R_{PreNum}, & N_{PerPage} \text{ includes main post} \\ R_{PreNum} + 1, & N_{PerPage} \text{ does not include main post} \end{cases}$$

$$C'_{ParseCount} = R_{CurNum} - R_{PreNum}$$

where, $R_{PreNum}$ represents the number of replies of the post of the previous collection, $R_{CurNum}$ represents the current number of replies of the post, and $N_{PerPage}$ represents the number of replies of the post in per page;
if the URL is not the URL of the first page of the post, the step (iv) further comprises:
determining whether the page index corresponding to the URL is identical to that of the page to be currently extracted, so as to determine if it is URL of an overlapping page,
wherein the page index of the page be currently extracted is determined in rule of:

$$P_{Begin} = \begin{cases} \text{ceil}\left(\dfrac{R_{PreNum}+1}{N_{PerPage}}\right), & N_{PerPage} \text{ includes main post} \\ \text{ceil}\left(\dfrac{R_{PreNum}}{N_{PerPage}}\right), & N_{PerPage} \text{ does not include main post} \end{cases}$$

where, $P_{Begin}$ represents the page index of the page to be currently extracted; ceil represents the operation of rounding up;
(4) if it is overlapping page, recalculating an origination of new replies $S'_{From}$ and the number $C'_{ParseCount}$ of new replies according to the following formulae, and extracting information of $C'_{ParseCount}$ new replies from the origination of new replies $S''_{From}$;

$$S''_{From} = \begin{cases} R_{PreNum} \% N_{PerPage} + 1, & N_{PerPage} \text{ includes main post} \\ R_{PreNum} \% N_{PerPage}, & N_{PerPage} \text{ does not include main post} \end{cases}$$

$$C''_{ParseCount} = \begin{cases} R_{CurNum} - R_{PreNum}, & \text{this page is last page} \\ N_{PerPage} - S''_{From}, & \text{this page is not last page} \end{cases}$$

where, "%" represents the operation of taking the remainder;

if the URL is neither the URL of the first page of the post, nor the URL of an overlapping page, the step (iv) further comprises:

recalculating an origination of new replies $S'''_{From}$ and the number $C'''_{ParseCount}$ of new replies according to the following formulae, and extracting information of $C'''_{ParseCount}$ new replies from the origination of new replies $S'''_{From}$;

$$S'''_{From} = 0;$$

$$C'''_{ParseCount} = \begin{cases} \begin{cases} R_{CurNum} \% N_{PerPage} + 1, & N_{PerPage} \text{ includes main post} \\ \begin{cases} (R_{CurNum} - 1) \% N_{PerPage} + 1, & \text{if } R_{CurNum} - 1 > 0, \text{this } page is \text{ last page} \\ 0, & \text{if } R_{CurNum} - 1 = 0, N_{PerPage} \text{ does not include main post} \end{cases} \end{cases} \\ N_{PerPage}, \text{ this } page is \text{ not last page} \end{cases}$$

10. The method according to claim 6, wherein extracting URLs of turned pages from the webpage contents in step (iv) comprises:

1) if the page turning mode in the forum is calculation page turning and the URL is that of the first page of the post, calculating beginning page index $P_{Begin}$ and ending page index $P_{End}$ of turned pages according to the following formulae, $$P_{Begin} = \begin{cases} \text{ceil}\left(\frac{R_{PreNum} + 1}{N_{PerPage}}\right), & N_{PerPage} \text{ includes main post} \\ \text{ceil}\left(\frac{R_{PreNum}}{N_{PerPage}}\right), & N_{PerPage} \text{ does not include main post} \end{cases}$$

$$P_{End} = \begin{cases} \text{ceil}\left(\frac{R_{CurNum} + 1}{N_{PerPage}}\right), & N_{PerPage} \text{ includes main post} \\ \text{ceil}\left(\frac{R_{CurNum}}{N_{PerPage}}\right), & N_{PerPage} \text{ does not include main post} \end{cases}$$

$$S_{From} = \begin{cases} R_{PreNum} \% N_{PerPage} + 1, & N_{PerPage} \text{ includes main post} \\ R_{PreNum} \% N_{PerPage}, & N_{PerPage} \text{ does not include main post} \end{cases}$$

If $S_{From} = 0$ and $R_{PreNum} > 0$, then $S_{From} = N_{PerPage}$, $P_{Begin} = P_{Begin} + 1$;

where $S_{From}$ represents the origination of new replies, and after calculating the beginning and ending page indexes of turned pages according to the above formulae, in combination of preset rules of URLs of turned pages, joining all the URLs of turned pages; and 2) if the page turning mode in the forum is next page of page turning, extracting URLs of turned pages from the webpage contents.

11. The method according to claim 10, wherein URLs of turned pages are divided into three parts, wherein a first part strBeforePage and a third part strAfterPage are invariant parts, and a second part nPageUp is a variant part; and joining URLs of turned pages includes:

nPageNo = i + nFirstPostPageIndex − 1;
nPageUp = (nPageNo × nPageUsBaseNum);
strPostPageUrl = strBeforePage + nPageUp + strAfterPage where, i represents the page index of turned page, $P_{Begin} \leq i \leq P_{End}$, nPageNo represents the page index of a new reply,
nFirstPostPageIndex=0 or 1 and represents the page index of the first page of post,
nPageUp represents the page index indicating the turned page filled in the URL to be joined,
nPageUsBaseNum represents the base number of turned pages, and
strPostPageUrl represents the joined URL.

12. The method according to claim 10, wherein in step 2), after extracting the URLs of turned pages from the webpage contents and before adding the URLs into a collection queue of content pages, the method further comprises eliminating duplicate of URLs of turned pages.

13. The method according to claim 12, wherein the eliminating comprises:

determining whether or not there is a post corresponding to a URL of turned page in the information table of URLs of turned pages, if not, establishing an information table of URLs of turned pages of the post corresponding to the URL of turned page, and inserting the URL of turned page into the information table of URLs of turned pages and a collection queue of content pages;

if yes, determining whether or not the page index of the URL of turned page is larger than the page index of turned pages of the post to which the URL of turned page belongs: if yes, updating the information table of URLs of turned pages of the post to which the URL of turned page belongs, and adding the URL of the turned page into the collection queue of content pages; and if not, directly deleting the URL of turned page.

14. The method according to claim 6, wherein, for the new-established post, the method further comprises:

determining that the URL of the first page of the post does not exist in the collection queue of content pages; and adding the URL of the first page of the post into the collection queue of content pages.

15. The method according to claim 6, wherein, for the post having new replies, the method further comprises:

determining the page turning mode in the forum of the post is calculation page turning; and adding the URL of the first page of the post having new replies into the collection queue of content pages.

16. The method according to claim 6, wherein, for the post having new replies, the method further comprises:

determining that the page turning mode in the forum of the post is next page of page turning;

searching the information table of URLs of turned pages to obtain a last URL of turned page of the post; and adding the obtained last URL into the collection queue of content pages.

17. A system for incrementally collecting replies in a forum, comprising:

a memory that stores executable components; and a processor, coupled to the memory, that executes the executable components to perform operations of the system, the executable components comprising:

a determining device configured to determine whether there is a newly-established post and a post having new replies in a forum list page, according to a URL of the first page of the post and information of the number of replies to the post; and an extracting device configured to extract a main post and reply information from the newly-established post, or for the post having new replies, calculate an origination and a number of the new replies, and extract the information of the new replies according to the origination and the number of the new replies, wherein the determining device comprises:

a first acquiring unit configured to acquire each URL of list page from a collection queue of list pages recording URLs of the at least one forum list page;

a list page extracting unit configured to retrieve the URL of the first page of each post and the number of current replies from webpage contents corresponding to the acquired URL; and a determining unit configured to determine if the post has been recorded in an information list of collected posts according to the retrieved URL of the first page, if not, the determining unit determines that the post is a newly-established post, and adds the retrieved URL of the first page and the retrieved number of current replies into an information list of collected posts.

18. The system according to claim 17, wherein the determining device comprises:

a first acquiring unit configured to acquire each URL of list page from the collection queue of list pages;

a list page extracting unit configured to extract extracting the URL of the first page of each post and the number of current replies from webpage contents corresponding to URLs of the forum list page; and a determining unit configured to determine whether each post exists in an information list of collected posts according to the URL of the first page of the post, such that if a post exists in the information list, the determining unit further determines whether the current number of replies of the post is larger than a present number of replies recorded in the information list of collected posts, wherein, if yes, then the determining unit determines that the post has a new reply and updates records of the number of previous replies and the number of present replies of the post in the information list of collected posts;

if the post does not exist in the information list of collected posts, then the determining unit further determines that the post is a newly-established post and then adds the URL of the first page and the number of current replies of the post into the information list of collected posts.

19. The system according to claim 17, wherein the extracting device comprises:

a second queuing unit configured to add the URL of the first page of the newly-established post and the URL of the post having new replies into a collection queue of content pages;

a scanning unit configured to regularly scan the collection queue of content pages;

a second acquiring unit configured to acquire each URL from the collection queue of content pages;

a content page extracting unit configured to extract webpage contents corresponding to the URL and extracting the main post and/or reply and/or URLs of turned pages from the webpage contents.

20. The system according to claim 19, wherein the extracting device further comprises a duplicate eliminating unit configured to eliminate a duplicate of URLs of turned pages extracted from the webpage contents when the page turning mode in the forum is next page turning.

* * * * *